Patented Oct. 17, 1944

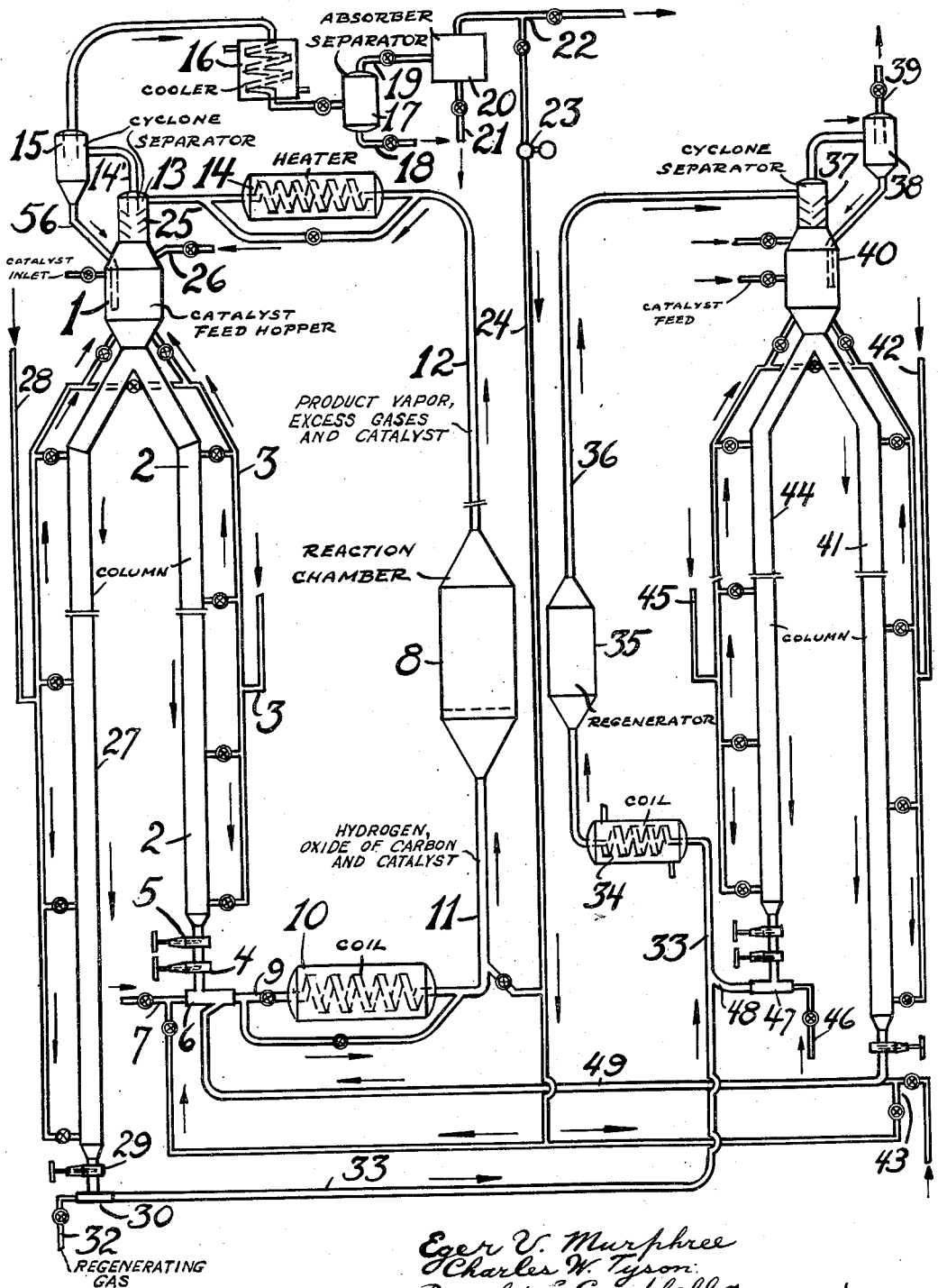

2,360,787

UNITED STATES PATENT OFFICE 2,360,787

CHEMICAL PROCESS

Eger V. Murphree and Charles W. Tyson, Summit, Donald L. Campbell, Short Hills, and Homer Z. Martin, Elizabeth, N. J., assignors, by mesne assignments, to Standard Catalytic Company, a corporation of Delaware Application December 27, 1940, Serial No. 371,922

8 Claims. (Cl. 260—449.6)

This invention relates to an improved process and apparatus for preparing reduction products of oxides of carbon, and more particularly, to processes involving reactions of carbon monoxide and hydrogen, such as the production of methanol and other alcohols, synthol and similar mixtures of liquid hydrocarbons and oxy-organic compounds, and synthin, including the Kogasins and other gaseous, liquid and solid hydrocarbon products.

The preparation of such reduction products of carbon monoxide is already known, and numerous catalysts have been described which are specifically active in promoting the desired reactions. These processes in general have been conducted heretofore by passing a gaseous mixture of carbon monoxide and/or carbon dioxide and hydrogen in proper proportions and concentrations through a reaction chamber filled with a suitable catalyst in lump, tablet or other solid form, or containing such solid catalysts arranged in beds or trays in the reaction zone. The reaction conditions of temperature, pressure, time of contact and the like, as well as the nature of the catalyst, are selected with regard to the type of product desired; atmospheric and relatively low pressures usually being used in the production of hydrocarbons, and higher pressures, even up to 200 atmospheres or more, being used to produce alcohols and other oxy-organic compounds such as acids, esters, ketones and the like. These processes required reactors equipped with expensive valving and piping arrangements to permit withdrawal of the reactors from reaction service for reactivating the catalyst from time to time. In addition, intricate and expensive cooling devices were required for maintaining the catalyst at proper reaction temperature.

An improved process has now been devised for conducting such reactions with solid catalyst particles which are suspended in a gaseous stream and this suspension is passed into the reaction zone. The catalyst is thus maintained in an actively mobile or fluidized state in the reaction zone, permitting much more effective contact with the gaseous reagents, uniform temperatures throughout the reaction zone, improved heat transfer and improved yields of products of better quality. As an alternative, these processes may also be conducted by passing a gaseous mixture of carbon monoxide and hydrogen in proper proportions and concentrations with suspended solid catalyst particles through a reaction zone. The addition of this catalyst to the stream of gaseous reactants, its separation after the reaction is complete, and its return to the reactant stream has, in accordance with previous known practices, required the use of mechanical moving parts, such as screw pumps, star feeders, and extensive systems of catalyst hoppers, at one or more points in the catalyst circulation system. These moving mechanical parts were required to introduce the catalyst from a storage or supply zone of relatively lower pressure into a reaction or treating zone of relatively higher pressure.

The present invention provides a very simple and effective method for introducing the catalyst into zones of higher pressure or higher elevation even in continuous operation, without the use of any moving mechanical parts, thereby permitting great simplification and economies in both the apparatus and the process.

The invention in its more specific phases is especially directed to processes in which the solid catalyst after passing through the reaction zone is separated from the gaseous or vaporous stream and again returned to the reaction zone. In particular, it has application to processes in which it is desirable to (1) reactivate or regenerate at least a portion of the catalyst before returning the same to the reaction zone, or (2) rapidly add or extract heat from the reaction zone in which strong exothermic or endothermic reactions are carried out. Other and further objects and advantages of this invention will be apparent from the following description, the claim and the drawing.

The drawing is a diagrammatic illustration in partial sectional elevation of apparatus suitable for carrying out various modifications of the process of this invention, and indicates the flow of materials.

A suitable solid catalyst in finely divided or powdered form is supplied to the catalyst feed hopper 1. The catalyst passes down a long and preferably vertical column 2 which is of sufficient height to provide the desired pressure at the base of this column, as will be explained below. Any suitable means is also provided for maintaining the catalyst particles in the hopper 1 and the column 2 in a readily mobile state. It has been found, for example, that finely powdered catalyst packs together and can be caused to flow only with difficulty if the surfaces of the solid particles are free from gas; this packing occurs even when the catalyst powder stands in a hopper in contact with air or other gas. The same catalyst powder flows readily in a manner closely simulating that of a liquid if even a thin layer of gas is maintained around each particle. This may be accomplished by passing a small stream of a suitable gas, such as an inert gas or one of the reagents to be used in the process, into the column 2 at one or more spaced points, preferably at least at a point near the top of this column, by gas supply line 3, which may also be used to supply gas to several points around the base of the hopper 1 in order to insure that the catalyst therein is in a continuously fluid condition. The flow of catalyst in the column may also be aided by shaking the column or the contents thereof, as by striking the outside of the column with heavy blows sufficient to cause some vibration thereof, by providing a vibrating or rotating rod or other suitable means for stirring or shaking the catalyst inside the column 2, or by admitting the gas through line 3 in pulses so as to induce vibration directly in the catalyst column. Such means for mechanically inducing vibration are useful primarily with solid catalysts of relatively large particle size; with fine catalyst powders sufficient gas should be provided to maintain a film of gas around each catalyst particle at the zone of highest pressure. When this is done, satisfactory flow of such catalyst powders is generally secured without any provision for shaking the catalyst.

The apparatus illustrated in the drawing is designed for the use of such finely powdered catalysts, although it will be understood that catalysts of much coarser particle sizes may also be used.

It has been found possible by using a column of the type described containing mobile or fluidized, finely divided solid catalyst, to provide a pressure head at the bottom of the column which is similar to the hydraulic or hydrostatic pressure head of a fluid column, the pressure being a direct function of the density of the catalyst powder and of the column height. For example, using a catalyst consisting of solid particles of about 200 to about 400 mesh size of activated clay having deposited thereon metal oxides of the iron group, the pressure obtainable with the column described is about ⅕ to about ⅛ pound per sq. in. per foot of column height.

This device has been especially effective as a means for supplying the catalyst, intermittently or continuously, to a reaction zone without the necessity of using for this purpose any apparatus having moving parts which come in contact with the catalyst. The star feeders, blow cases, plunger and screw operated pumps of the Fuller Kinyon type heretofore used for this purpose are accordingly eliminated.

The lower end of the column 2 is provided with a suitable valve 4 for regulating the amount of catalyst discharging therefrom. A conventional slide valve having an apertured slide which can be adjusted to regulate the size of the orifice through which the powder passes is suitable for this purpose, although other types of valves may be used. This valve may be operated manually or automatically, such as by the level in the hopper 1 or by a venturi or other type of meter in the stream of gaseous reagents or in the suspension of catalyst flowing to or from the reaction zone, to be described below. A drop in pressure across the valve 4 of about 2 to about 5 pounds per square inch is generally desired in order to provide adequate control of the flow of the catalyst powder. Valve 4 may also be so controlled as to avoid breaking the seal of powdered material in standpipe 2 due to sudden pressure surges or other causes. For this purpose it may be caused to close quickly in case the level of powdered material in hopper 1 falls below a certain predetermined level or in case pressure drop across valve 4 falls below a certain value. Other indications of abnormal conditions may also be used to cause valve 4 to close.

As a safety precaution to prevent the possibility of the carrying gases, to be described below, passing upwardly through the standpipe, a second safety valve 5 is preferably provided. This valve may be operated automatically to close when the level of powder in the hopper 1 drops below a predetermined point or it may be designed to close automatically when the pressure below the valve 4 approaches or equals the pressure above the valve 4.

The catalyst powder thus leaves the bottom of column 2 through the valve 4 and passes into a mixing chamber 6, to which a suitable gas, either an inert gas or preferably one or more of the reagents to be used in the process, is supplied by line 7. This gas is supplied in sufficient quantity and velocity to substantially completely entrain the catalyst, and this suspension is then passed as a freely flowing stream through any suitable pipe or other conduit to the reaction vessel 8. The catalyst suspension leaving the mixing chamber 6 may also be subjected to any suitable preliminary treatment, such as heating, cooling and/or mixing with other reagents, prior to its introduction into the reaction chamber 8; for example, the catalyst suspension may be passed from the mixing zone 6 through line 9 and heating or cooling coil 10 and line 11 into the reaction chamber 8.

While the catalyst may be passed either upwardly or downwardly through the reaction zone 8, it is generally preferred to introduce the catalyst suspension into the lower portion of the reaction vessel and to pass it upwardly therethrough. In this manner of operation, the more dense catalyst particles will lag behind the less dense suspending gases or vapors and the catalyst concentration in the reaction zone will thus be substantially greater than in the suspension of catalyst supplied thereto. It is also generally preferred to pass the gases and/or vapors (the term gas being used throughout this application to indicate a gasiform state including both normally gaseous materials and the vapors of liquids) upwardly through the reaction zone at such a rate that the solid catalyst particles are partially suspended therein in a highly mobile, vibrating condition such that the mass of catalyst particles has the highly turbulent appearance of a boiling liquid. This involves the use in the reaction zone of an aveage upward velocity of the gas which is insufficient to blow all of the catalyst quickly out of the reaction zone, but which is sufficient to carry overhead a catalyst suspension containing the same quantity of catalyst per unit of time as in the suspension supplied to the bottom of the reaction vessel.

The temperature of the reaction zone may be controlled by the amount and temperature of the materials supplied thereto, and/or by heat exchange through the walls. Since in the processes of this invention, the reactions are generally exothermic, and great increases in temperature in the reaction zone should be avoided, large amounts of catalyst and/or recycle gases may be cooled and recycled to the reaction zone, and heat exchangers, such as tubes for the circulation of cooling fluids such as water, may be provided. The reactor may also be designed as a long, slender vessel or tube, or even a plurality of such tubes connected in parallel with provision for removing heat through the walls thereof.

The reaction products and catalyst suspended therein are withdrawn from the reaction vessel through line 12 and pass into a catalyst separating zone 13, which may be constructed in the form of a "cyclone" centrifugal or other type of separator. In the event that products which are liquid under the reaction conditions are formed, the catalyst suspension may be passed through the heating zone 14 in order to vaporize such products partially or completely and thereby to improve the operation of the separator 13. The gaseous products are withdrawn by line 14 and may be passed through one or more secondary cyclone separators 15 and/or electrical precipitators or filters to remove additional catalyst and then through the product cooler 16 and into a separating vessel 17, from which liquid products are withdrawn by line 18 and uncondensed gases by line 19. These gases may be passed through an absorption plant indicated diagrammatically at 20 for the recovery of volatile, light liquid products with activated charcoal or other suitable solid absorbent or liquid solvents. These recovered liquid products may be withdrawn by line 21 and the residual gases by line 22. These gases may be removed from the system or may be recycled as desired by pump 23 and line 24.

The catalyst separated from the gaseous products in separating zone 13 may be passed downwardly through a stripping column 25 in countercurrent to steam, inert gas or other suitable stripping gas supplied by line 26, and into any suitable hopper. For convenience in operation the catalyst is preferably returned to the hopper 1, although a separate hopper, connecting with a separate means of supplying the catalyst to regeneration treatment may also be used. Catalyst separated in the secondary separator 15 may also be returned to the hopper 1, as by gravity flow through line 56, which extends below the level of the catalyst in hopper 1.

The regeneration of catalysts used in processes involving the reduction of carbon monoxide usually involves removal of carbonaceous and other impurities deposited on the catalyst. Also, catalysts used in the synthesis of hydrocarbon liquids usually accumulate substantial quantities of normally solid hydrocarbons or wax which may be removed by reduction with hydrogen or which may be separated by extracting the catalyst with suitable liquid solvents such as naphthenic or aromatic solvent naphthas or gas oils. The catalyst may accordingly be subjected to several different treatments for its regeneration, only one being shown for purpose of simplicity in the drawing, as it will be understood that additional treatments with other gases similar to the treatment described may be used in series and a solvent extraction treatment may be used in place of, or prior to, the regeneration treatment illustrated.

The catalyst may be passed to the regeneration zone from the hopper 1 by means of a second column 27, which may be constructed and operated similarly to the column 2, and is provided with a gas supply line 28 for maintaining the catalyst in a mobile condition and with one or more valves 29 for controlling the admission of the catalyst into the mixing chamber 30. Valve 29 may be made to close in case of pressure surges or other abnormal conditions in the manner described above in the case of valve 4. A record safety valve may also be used similarly to valve 5.

A stream of a regenerating gas such as hydrogen, or hydrogen diluted with nitrogen or other inert gases, is supplied to the mixing chamber 30 by line 32 and the suspension of the used catalyst therein is passed through line 33 and through the heater or cooler 34, if such treatment is desired, and then into the lower portion of the regeneration zone 35, which may be constructed and operated similarly to the reaction zone 8, suitable means being also provided for heating or cooling the regeneration zone as required. The regenerated catalyst and gases leaving the regenerator 35 through line 36 are passed into a catalyst separating and stripping zone 37, the gases being passed through one or more secondary catalyst separators 38 and then vented through line 39 or recycled to the regeneration zone as desired. The regenerated catalyst is collected in a hopper 40, which is also provided with a column 41 and a gas supply line 42 or other suitable means for maintaining the catalyst in a mobile condition in the column as described above in connection with the hopper 1 and column 2 and is operated in a similar manner. The height of column 41 is designed to provide a pressure head at the bottom thereof sufficient to permit the return of the catalyst through the reaction vessel 8 to the hopper 1, this being accomplished by a suitable gas, such as hydrogen or a mixture of hydrogen and carbon monoxide, which is supplied for that purpose through line 43.

It may also be desirable to recycle a portion of the catalyst from the hopper 40 through the regenerator 35, to complete the regeneration of the catalyst and/or to aid in the control of the temperature in the regeneration zone. For this purpose, the regenerated catalyst hopper 40 may be provided with a second column 44 which may be constructed and operated similarly to the catalyst feed column 1 and may be provided with a gas supply line 45 for maintaining the catalyst in a mobile condition. This column should be of sufficient height to provide a pressure head at the bottom sufficient to permit the return of the catalyst through the regenerator 35 to the hopper 40, this being accomplished by a stream of a suitable regenerating gas supplied by line 46 to the mixing chamber 47 from which the suspension of catalyst may be passed by line 48 into line 33 or directly into the regenerator 35. Proper temperature control in the regenerator 35 may be obtained by heating or cooling the stream passing through the coil 34. In this manner a part of the regenerated catalyst may be recycled through the regenerator 35 by line 48 and the remainder passed to the reaction zone 8 by lines 49, 9 and 11. Suitable means for temperature control, such as the heater or cooler 10, may be provided to maintain a suitable temperature in the reactor 8. Fresh catalyst may also be supplied to the hoppers 1 or 40 to make up for catalyst losses and for any that may be withdrawn from the system for a more complete regeneration.

The various catalyst supply columns described above are preferably designed to be of sufficient height to provide for continuous circulation of the catalyst through the system by the suspending gases as indicated, each column being at least of sufficient height to provide for the pressure drop involved in passing the catalyst suspension through any control valves at the bottom of that column and through the reaction and/or regeneration equipment to the next catalyst feed column in the circuit. Additional column height may be provided as desired to increase the pressure in the reaction and/or regeneration zones. The catalyst supply hopper at the top of each feed column may be at substantially atmospheric pressure or, particularly when the reactions involving the use of the catalyst are conducted at superatmospheric pressures, the entire catalyst circuits may be operated as closed systems and the gases may thereby be separated from the catalyst under practically the same pressure as the reaction or regeneration pressures, respectively.

The reagents, catalysts and operating conditions used in the above described apparatus will naturally be varied according to the nature of the products desired, these conditions generally being already known. For example, in the synthesis of hydrocarbons from carbon monoxide and hydrogen, the reaction is preferably conducted at substantially atmospheric or moderately elevated pressures with catalysts containing metallic cobalt, iron, nickel or copper, which may be in admixture with promoters such as the oxides of chromium, zinc, aluminum, magnesium, manganese and the rare earth metals and which may be deposited on siliceous carriers such as kieselguhr and pumic and synthetic gels such as the hydrates of silica and/or alumina. The gases are preferably substantially free of sulfur and oxygen and are supplied to the reaction zone, for example, in a ratio of about 1 mol of carbon monoxide to 2 mols of hydrogen, the total gaseous feed containing, for example, above about 24% of carbon monoxide and 48% of hydrogen, the remainder being nitrogen or other substantially inert gases which may include small amounts of carbon dioxide. The reaction vessel may be maintained at between about 1 and 20 atmospheres pressure at temperatures between 350 and 430° F. with catalysts containing compounds of cobalt and magnesia; with catalysts containing iron, pressures between about 1 and 100 atmospheres and temperatures between 550 and 650° F. may be used. In general, operating temperatures will be in the range of 350 to 700° F., depending on the catalyst and the operating condtions used. The recirculation to the reaction zone of uncondensed product gases may be used to increase the conversion and/or to aid temperature control. The amount of recycle gases, especially for the latter purpose, will be determined by the amounts of catalyst used, and the reactor heat exchanger design. Under some conditions, it will be found undesirable to recycle any gas at all, as such high conversions per pass will be obtained as to render gas recirculation unprofitable. Under conditions of low conversion per pass, it may be found desirable to recycle a quantity of ten times or more of the weight of the fresh feed gas. In such cases the recycle gas may be used to suspend the catalyst and may be passed by line 24 to line 7 and/or line 43. The amount of catalyst supplied to the reaction zone will generally be between about 0.1 and 25 pounds per cubic foot (at reaction conditions) of the total feed and recycle gases. The optimum time of reaction of the gases in passing through the reaction zone generally ranges between about ½ second to 2 minutes.

This reaction is highly exothermic and great difficulties are experienced in ordinary operation in preventing localized hot spots and overheating of the catalyst, an important advantage of the present process being the uniformity of temperature which is consistently maintained throughout the reaction vessel when operating with a catalyst suspension maintained therein as described above. Once the reaction is started, the temperature will be found to be uniform within a few degrees throughout all parts of the reaction vessel, due to the extreme turbulence existing in the catalyst suspension therein, even though the catalyst and/or the gases, either fresh or recycled in either case, be supplied at a much lower temperature. In such cases it is of course desirable to provide a sufficiently high average temperature level in the reaction zone to insure the progress of the reaction. Suitable steps are of course necessary to take up the heat liberated in the reaction in order to avoid general overheating of the reaction vessel. This may be accomplished by supplying a relatively cool suspension of catalyst and gas to the reaction zone, by supplying cool recycle gas thereto and/or by providing heat exchanger surfaces in the reaction zone such as tubes or coils through which water or other suitable cooling fluid is circulated.

The regeneration of catalysts used in the synthesis of hydrocarbons may be accomplished rapidly by subjecting the catalyst to treatment with hydrogen at temperatures preferably somewhat higher than those used in the synthesis reaction, for example, of the order of 500 to 700° F. or higher.

The following example is presented to illustrate a suitable method for carrying out the process of this invention in the preparation of a synthetic hydrocarbon motor fuel from carbon monoxide and hydrogen. The proces will be described with reference to the apparatus illustrated in the drawing.

*Example 1*

A finely powdered catalyst of the Fischer-Tropsch type consisting of about 30% cobalt and a metal oxide promoter deposited on kieselguhr and having an aerated bulk density of approximately 30 pounds per cubic foot, and a particle size between 10 and 50 microns is supplied to the hopper 1 and the column 2. This column is about 120 feet high, thereby providing a pressure at the base above the valve 4 of about 28 pounds per square inch gauge with the hopper 1 at a pressure of about 3 pounds per sq. in. gauge. It will be understood that the exact pressure obtained with a column of given height will vary somewhat with the nature of the catalyst and with the amount of fluidizing gas supplied to the column. A small amount of hydrogen is passed into the column through line 3 to keep the catalyst in a fluid-like condition. The amount of fluidizing gas supplied should be sufficient to maintain a gas film about each catalyst particle at the zone of maximum pressure; in general a minimum amount of about 3 to 4 cubic feet (at the conditions prevailing in the column) per 100 pounds of the catalyst being required. The catalyst flows from the bottom of the column into the chamber 6 where it is mixed with a feed gas containing 95% hydrogen and carbon monoxide in a ratio of 2:1, and free of all forms of sulfur, supplied at a pressure of about 23 pounds gauge, thereby permitting a pressure drop of about 5 pounds per sq. in. across the control valve 4. The mixture is passed through coil 10, which is used initially as a heating coil in order to start the reaction, and later as a cooling coil, and into the lower portion of the reactor 8. The temperature in the reaction zone is maintained at about 410° F. in a manner that will be explained below. The mixture of catalyst, products and reacting gases leaves the reactor by line 12 and the catalyst is separated from gaseous materials in the separator 13 and stripper 25, hydrogen being supplied as a stripping gas through line 26. This gaseous mixture is then passed through a condenser 16 into separator 17, whence the condensed fractions are withdrawn and vapors of liquid products remaining in the gas are removed in absorber 20. In operating under the conditions of this example, the degree of conversion obtained is so high that recirculation of the gas is generally not necessary.

The catalyst returned to hopper 1 is recycled to the reactor 8, either with or without a regenerating treatment. It will be found desirable to regenerate the catalyst at intervals, and a suitable method for doing this is to pass a part of the recycled catalyst through a regenerator 35, operating continuously. The catalyst leaving the column 27 is thus picked up in a stream of hydrogen supplied by line 32 and this stream is passed by line 33 through the regeneration zone 35 to hopper 40, whence sufficient head is provided in column 41 for passing it with reaction feed gases supplied by line 43 through line 49, cooler 10 and back through the reactor 8 to the hopper 1. The regenerator 35 is maintained at a temperature of about 575° F. by the addition or removal of heat in coil 34 and/or by the recirculation of catalyst from column 44.

Operating in this manner under continuous conditions, the heat of reaction will be largely absorbed by the catalyst and removed from the system in the cooler 10 which may be constructed in the form of a waste heat boiler for the generation of steam. Using a catalyst circulation through the reaction zone of 1,500 tons per hour and a synthesis gas supply of 34,000,0000 cubic feet (standard conditions) per day supplied at about 100° F., with the catalyst supplied at about 300° F., the mixture of catalyst and synthesis gas will enter the reaction zone at about 296° F., and the heat of reaction in this zone will provide a uniform temperature throughout of about 410° F. The products leaving the reactor 8 by line 12 may be passed directly to the separator 13 or may be heated to a temperature of about 450 to 500° F. in the heater 14 in order to vaporize products deposited on the catalyst. Some cracking and dehydrogenation of the products may also be secured in this heating operation, thereby producing motor fuel products of better anti-knocking characteristics. The recycled catalyst from standpipe 2 and line 49 is cooled to about 300° F. in the cooler 10. There should thus be obtained a very high conversion, approaching about 95% of the theoretical and providing a yield of about 1,160 barrels per day of liquid hydrocarbons having a specific gravity of about 0.69.

In the synthesis of methanol and higher alcohols and oxy-organic compounds from carbon monoxide and hydrogen, relatively higher pressures are generally used than in the Fischer-Tropsch synthesis. For example, methanol may be synthesized from carbon monoxide and hydrogen in the process and apparatus described above by maintaining the reaction zone at a pressure of the order of 200 atmospheres and a temperature of about 525 to about 700° F. and using finely divided catalysts such as the oxides of copper, zinc, chromium, manganese and aluminum. Higher alcohols may be synthesized under similar conditions at temperatures of about 650 to about 850° F. with catalysts containing iron oxide and alkaline compounds such as sodium oxide or carbonate. In any operation at substantial superatmospheric pressures, in which a very high catalyst supply column 2 would be required to equal the reaction pressure, it is generally preferable to operate with the entire catalyst circuit in a closed system and to use catalyst supply columns only of sufficient height to provide for the pressure drop involved in passing the catalyst suspension from the bottom of the column through reaction and/or regeneration equipment to the next catalyst hopper in the circuit.

This invention is not to be limited to any specific examples presented herein, all such being intended solely for purpose of illustration.

We claim:

1. A continuous process for the preparation of valuable organic products by the reduction of carbon monoxide with hydrogen comprising passing a confined stream of gas through an extended path including a reaction zone, imposing a pressure on the said stream at least sufficient to overcome the resistance of said path to the flow of said gas under obtaining conditions, maintaining a vertical column of finely divided solid catalytic material in a catalyst supply chamber, supplying a gaseous fluidizing medium into the catalyst at least in one portion of said column in an amount sufficient to maintain therein a mixture of said gaseous medium in said finely divided solid catalytic material in freely flowing state throughout the full length of said column but small compared to the first-mentioned gaseous stream, passing the catalyst-fluidizing gas mixture from the bottom of said column into said stream to form a suspension of said catalytic material in said first-mentioned gas stream, said column having a height which will produce a fluid pressure head over the bottom of said column at least equal to the pressure on said first-mentioned gas and sufficient to cause a continuous flow of said suspension at least through said reaction zone, and passing said suspension of said catalytic material through said reaction zone together with any additional reactant gases required for the reaction.

2. A continuous process for the preparation of synthetic hydrocarbon liquid by the reduction of carbon monoxide with hydrogen comprising passing a confined stream of gas through an extended path including a reaction zone, imposing a pressure on said stream at least sufficient to overcome the resistance of said path to the flow of said gas under obtaining conditions, maintaining a vertical column of finely divided solid catalytic material in a catalyst supply chamber, supplying a gaseous fluidizing medium to said column in sufficient amount to maintain therein a mixture of said gas and finely divided solid catalytic material in freely flowing state throughout the full length of said column, transferring the fluidized catalyst from the bottom of said column into said gas stream to form a suspension of said catalyst therein, said column having a height which will produce a fluid pressure head over the bottom sufficient to feed said catalyst from the bottom of said column into said first-mentioned gas stream and to cause a continuous flow of said suspension at least through said reaction zone, passing said suspension together with any additional reactant gases required for the reaction upwardly through a reaction zone at a velocity sufficient to cause the catalyst in the reaction zone to be in a turbulent state, withdrawing a suspension of said catalyst in a gasiform stream of product vapors and gases from the upper portion of said reaction zone, heating said last-mentioned suspension to a temperature substantially higher than the temperature in the reaction zone, passing said withdrawn suspension into a solids separating zone at a level higher than the top of said column, separating the catalyst therein from gases and product vapors and returning the separated catalyst to the upper portion of said column.

3. A continuous process for the preparation of synthetic hydrocarbon liquid by the reduction of carbon monoxide with hydrogen comprising passing a confined stream of gas through an extended path including a reaction zone, imposing a pressure on said stream at least sufficient to overcome the resistance of said path to the flow of said gas under obtaining conditions, maintaining a vertical column of finely divided catalyst in a catalyst supply chamber, supplying a gaseous fluidizing medium to said column in sufficient amount to maintain therein a mixture of said gas and said finely divided solid catalytic material in freely flowing state throughout the full length of said column, transferring the fluidized catalyst from the bottom of said column into said gas stream to form a suspension of said catalyst therein, said column having a height which will produce a fluid pressure head over the bottom sufficient to feed said catalyst from the bottom of said column into said first-mentioned gas stream and to cause a continuous flow of said suspension into said reaction zone, passing said suspension through a cooling zone, passing the cooled suspension together with any additional reactant gas required for the reaction into the lower portion of and upwardly through a reaction zone at a velocity sufficient to cause the catalyst in the reaction zone to be in a turbulent state, withdrawing a suspension of said catalyst in a gasiform stream of product vapors and gases from the upper portion of said reaction zone, passing said withdrawn suspension into a solids separating zone at a level higher than the top of said column, separating the catalyst therein from gases and product vapors, and returning the separated catalyst to the upper portion of said column.

4. A continuous process for the preparation of synthetic hydrocarbon liquid by the reduction of carbon monoxide with hydrogen comprising passing a confined stream of gas through an extended path including a reaction zone, imposing a pressure on said stream at least sufficient to overcome the resistance of said path to the flow of said gas under obtaining conditions, maintaining a vertical column of finely divided catalyst in a catalyst supply chamber, supplying a gaseous fluidizing medium to said column in sufficient amount to maintain therein a mixture of said gas and said finely divided solid catalytic material in freely flowing state throughout the full length of said column, transferring the fluidized catalyst from the bottom of said column into said gas stream to form a suspension of said catalyst therein, said column having a height which will produce a fluid pressure head over the bottom sufficient to feed said catalyst from the bottom of said column into said first-mentioned gas stream and to cause a continuous flow of said suspension at least through said reaction zone, passing said suspension together with any additional reactant gas required for the reaction upwardly through a reaction zone at a velocity sufficient to cause the catalyst in the reaction zone to be in a turbulent state, withdrawing a suspension of said catalyst in a gasiform stream of product vapors and gases from the upper portion of said reaction zone, passing said withdrawn suspension into a solids separating zone at a level higher than the top of said column, separating the catalyst therein from gases and product vapors, continuously regenerating a portion of the separated catalyst, returning said regenerated portion continuously to said reaction zone, and returning the remainder of the separated catalyst to the upper portion of said column.

5. A continuous process for the preparation of synthetic hydrocarbon liquid by the reduction of carbon monoxide with hydrogen comprising passing a confined stream of gas through an extended path including a reaction zone, imposing a pressure on said stream at least sufficient to overcome the resistance of said path to the flow of said gas under obtaining conditions, maintaining a vertical column of finely divided catalyst in a catalyst supply chamber, supplying a gaseous fluidizing medium to said column in sufficient amount to maintain therein a mixture of said gas and said finely divided solid catalytic material in freely flowing state throughout the full length of said column, transferring the fluidized catalyst from the bottom of said column into said gas stream to form a suspension of said catalyst therein, said column having a height which will produce a fluid pressure head over the bottom sufficient to feed said catalyst from the bottom of said column into said first-mentioned gas stream and to cause a continuous flow of said suspension at least through said reaction zone, passing said suspension together with any additional reactant gas required for the reaction upwardly through a reaction zone at a velocity sufficient to cause the catalyst in the reaction zone to be in a turbulent state, withdrawing a suspension of said catalyst in a gasiform stream of product vapors and gases from the upper portion of said reaction zone, passing said withdrawn suspension into a solids separating zone at a level higher than the top of said column, separating the catalyst therein from gases and product vapors, returning a portion of the separated catalyst to the upper portion of that column, adding another portion of the separated catalyst to the upper portion of a second catalyst column, maintaining said second catalyst column over its entire length in a freely flowing state, passing a stream of a regenerating gas through an an extended path including a regenerating zone, imposing a pressure on said regenerating gas stream at least sufficient to overcome the resistance of said path to the flow of said regenerating gas, transferring catalyst from the bottom of said second column into said regenerating gas stream to form a suspension of said catalyst therein, said second catalyst column having such a height as to produce a fluid pressure head sufficient to feed said catalyst from the bottom of said second column into said stream of regenerating gas and to cause a continuous flow of said last-mentioned suspension at least through said regenerating zone, passing said last-mentioned suspension through said regenerating zone and then through a solids separating zone, separating regenerated catalyst therein from accompanying gases and returning the regenerated catalyst to said reaction zone.

6. A continuous process for the preparation of valuable organic products by the continuous reduction of carbon monoxide with hydrogen comprising passing a confined stream of reactant gas through an extended path including a reaction zone, imposing a pressure on the said stream at least sufficient to overcome the resistance of said path to the flow of said gas under obtaining conditions, maintaining a vertical column of finely divided solid catalytic material in a catalyst supply chamber, supplying a gaseous fluidizing medium into the catalyst at least in one portion of said column in an amount sufficient to maintain therein a mixture of said gaseous medium and said finely divided solid catalytic material in freely flowing state throughout the full length of said column, said fluidizing medium being small compared to the first-mentioned gaseous stream, passing the catalyst-fluidizing gas mixture from the bottom of said column into said stream to form a suspension of said catalytic material in said first-mentioned gas stream, said column of catalyst having sufficient height to produce a fluid pressure head over the bottom of said column at least equal to the pressure on said first-mentioned gas stream and sufficient to cause a continuous flow of said suspension into said reaction zone, introducing said suspension into said reaction zone maintained under reaction conditions, effecting the reaction of carbon monoxide with hydrogen, recovering reaction products from the vapors removed from the reaction zone and introducing at least a portion of the solid catalytic material removed from the reaction zone into the upper section of a vertical column of said finely divided solid catalytic material maintained in a fluidized condition as hereinbefore described.

7. A continuous process for the preparation of synthetic hydrocarbon liquid by the reduction of carbon monoxide with hydrogen comprising passing a confined stream of gas through an extended path including a reaction zone, imposing a pressure on said stream at least sufficient to overcome the resistance of said path to the flow of said gas under obtaining conditions, maintaining a vertical column of finely divided catalyst in a catalyst supply chamber, supplying a gaseous fluidizing medium to said column in sufficient amount to maintain therein a mixture of said gas and said finely divided solid catalytic material in freely flowing state throughout the full length of said column, transferring the fluidized catalyst from the bottom of said column into said gas stream to form a suspension of said catalyst therein, said column having a height which will produce a fluid pressure head over the bottom sufficient to feed said catalyst from the bottom of said column into said first-mentioned gas stream and to cause a continuous flow of said suspension at least through said reaction zone, passing said suspension together with any additional gas required for the reaction upwardly into a reaction zone maintained under reaction conditions at a velocity sufficient to cause the catalyst in the reaction zone to be in a turbulent state, removing product vapors from said reaction zone, recovering reaction products from the vapors removed from the reaction zone, introducing a portion of the solid catalytic material removed from the reaction zone into the upper section of a vertical column of said finely divided solid catalytic material maintained in a fluidized condition as hereinbefore described, adding the remainder of the solid catalytic material removed from the reaction zone into the upper portion of a second catalyst column, maintaining said second catalyst column over its entire length in a freely flowing state, passing a stream of a regenerating gas through an extended path including a regenerating zone containing the remainder of the catalyst removed from the reaction zone, imposing a pressure on said regenerating gas stream at least sufficient to overcome the resistance of the said path to the flow of said regenerating gas, transferring catalyst from the bottom of said second catalyst column into said regenerating gas stream to form a suspension of said catalyst therein, said second catalyst column having such a height as to produce a fluid pressure head sufficient to feed said catalyst from the bottom of said second column into said stream of regenerating gas and to cause a continuous flow of said last-mentioned suspension into said regenerating zone, recovering regenerated catalyst from the regenerating zone and returning the regenerated catalyst to said reaction zone.

8. A continuous process for the preparation of valuable organic products by the catalytic reduction of carbon monoxide with hydrogen comprising passing a confined stream of reactant gases through an extended path including a reaction zone, imposing a pressure on the said stream at least sufficient to overcome the resistance of said path to the flow of said gases under obtaining conditions, maintaining a vertical column of finely divided solid catalytic material in a catalyst supply chamber, supplying a gaseous fluidizing medium into the catalyst at least in one portion of said column in an amount sufficient to maintain therein a mixture of said gaseous medium and said finely divided solid catalytic material in freely flowing state throughout the length of said column, said fluidizing medium being small compared to the first-mentioned gaseous stream, passing the catalyst-fluidizing gas mixture from the bottom of said column into said stream to form a suspension of catalytic material in said first-mentioned gas stream, said column having a height sufficient to produce a fluid pressure head over the bottom of said column at least equal to the pressure on said first-mentioned gas stream and sufficient to cause a continuous flow of said suspension into said reaction zone, adjusting the temperature of said stream of gaseous reactants and catalyst entering the said reaction zone by introducing a sufficient amount of catalyst at a temperature sufficiently below the reaction temperature to maintain a substantially constant reaction temperature in the reaction zone, by passing said suspension of catalytic material into said reaction zone together with any additional reactant gases required for effecting the reaction.

EGER V. MURPHREE.
CHARLES W. TYSON.
DONALD L. CAMPBELL.
HOMER Z. MARTIN.

Certificate of Correction

Patent No. 2,360,787. October 17, 1944.

EGER V. MURPHREE ET AL.

It is hereby certified that error appears in the printed specification of the above numbered patent requiring correction as follows:

Page 5, first column, line 43, for "34,000,0000" read *34,000,000*;

and that the said Letters Patent should be read with this correction therein that the same may conform to the record of the case in the Patent Office.

Signed and sealed this 11th day of October, A. D. 1949.

[SEAL]

THOMAS F. MURPHY,
*Assistant Commissioner of Patents.*